Oct. 14, 1969     C. B. RICHEY ET AL     3,472,528
CONVERTIBLE CATEGORY IMPLEMENT TRACTOR HITCH
Filed Oct. 26, 1967     2 Sheets-Sheet 1

INVENTORS.
CLARENCE B. RICHEY
BY RONALD E. RASMUSSEN

Tweedale & Gerhardt
ATTORNEYS.

United States Patent Office 3,472,528
Patented Oct. 14, 1969

3,472,528
CONVERTIBLE CATEGORY IMPLEMENT TRACTOR HITCH
Clarence B. Richey, Fresno, and Ronald E. Rasmussen, Sanger, Calif., assignors to Massey-Ferguson Inc., Detroit, Mich.
Filed Oct. 26, 1967, Ser. No. 678,274
Int. Cl. B60d 1/14, 7/00
U.S. Cl. 280—415                                    8 Claims

ABSTRACT OF THE DISCLOSURE

A universal coupling for connecting either a Category I or II implement with either a Category I or II tractor three-point hitch and comprising a cross-member with an upright mast mounted between the ends of the cross-member. Provision is made for the mounting of Category I and the Category II hitch pins on the coupling which are selectively engageable by the implement hitch link and tractor and hitch links in accordance with their respective sizes.

BACKGROUND OF THE INVENTION

Field of the invention

This invention relates to couplers for connecting agricultural implements with tractors of the type having three-point hitches.

Description of the prior art

Certain dimensions for implements and tractor hitch links including the size and location of the hitch pins for implements, as well as the holes for receiving the hitch pins in the tractor links, are governed by American Society of Agricultural Engineering Standards in accordance with power requirements for pulling the implement. According to present A.S.A.E. Standards, implements and tractor hitches are divided into three categories as follows:

| Category: | Maximum drawbar horsepower |
|---|---|
| I | Up to 45 |
| II | 40–100 |
| III | 80 and over |

Implements generally are provided with cantilevered lower hitch studs, that is the hitch stud is supported on the implement at one end only for connection with the tractor lower links, and an upper hitch point in the form of a hole for receiving a pin carried with the upper link of the tractor hitch.

Thus, a Category I implement will have hitch studs of a size sufficient to carry a maximum Category I load with the studs mounted in cantilever fashion. Similarly, the diameter of the Category II hitch studs is designed to carry a maximum Category II load with the studs cantilevered on the implement. The horizontal distance between the mounted ends of the hitch studs is designated by A.S.A.E. as the "lower hitch point spread," and the dimension thereof is governed by the standards according to Category.

A tractor having a Category I hitch has an upper link with a Category I pin and hole, and lower links with Category I size holes for receiving the Category I hitch studs or pins. Thus, a Category I implement can generally be attached only to a tractor having Category I hitch links, and a Category II implement can be attached only to a tractor having Category II hitch links.

SUMMARY OF THE INVENTION

An object of this invention is to provide a coupler for connecting an implement to a tractor hitch wherein an implement having one size of hitch studs or pins can be attached with a tractor hitch having holes for receiving hitch pins of a size different from that of the implement.

A further object is to provide a coupler by means of a Category I implement can be attached to a Category II tractor hitch and vice versa, without sacrificing performance.

Still another object is to provide a coupling in which an implement of one category can be attached to a tractor having a hitch of a different category.

The foregoing, and other objects, are achieved by the coupler including a cross-member with an upright mast mounted between its ends. The mast is made up of a pair of spaced, parallel plate members and is formed with two sets of Category I holes and two sets of Category II holes. Attachment units are provided at each end of the cross-member in the form of three plates, e.g., inner, outer and middle plates, depending from the ends of the cross-member. A first pair of Category II holes is provided in the inner and middle plates in alignment with a Category I hole in the outer plate and a second pair of Category II holes is provided in the middle and outer plates in alignment with a Category I hole in the inner plate. Stepped pins are engageable with the Category I and II holes. The stepped pins have a portion of Category I diameter and a portion of Category II diameter. The pins are supported at both ends between the plate members so that the Category I diameter pin has adequate strength to carry Category II loads. Consequently, a Category II implement can be attached through the coupler to a tractor having a Category I hitch, and vice versa.

BRIEF DESCRIPTION OF THE DRAWINGS

In FIG. 1, reference numeral 2 designates a tractor to which an implement 4 is attached. The tractor is provided with a three-point hitch including an upper hitch link 6 and a pair of lower draft links 8 each having ball ends 10 with holes 11 (FIG. 3) for receiving hitch pins. Located on the implement according to A.S.A.E. Standards is an upper hitch point hole 12 (FIG. 1) and a pair of lower hitch studs 14, only one of which is visible in the drawing. The implement 4 is connected to the tractor links 6, 8 through a coupling member designated collectively by reference numeral 16.

Figure 1:
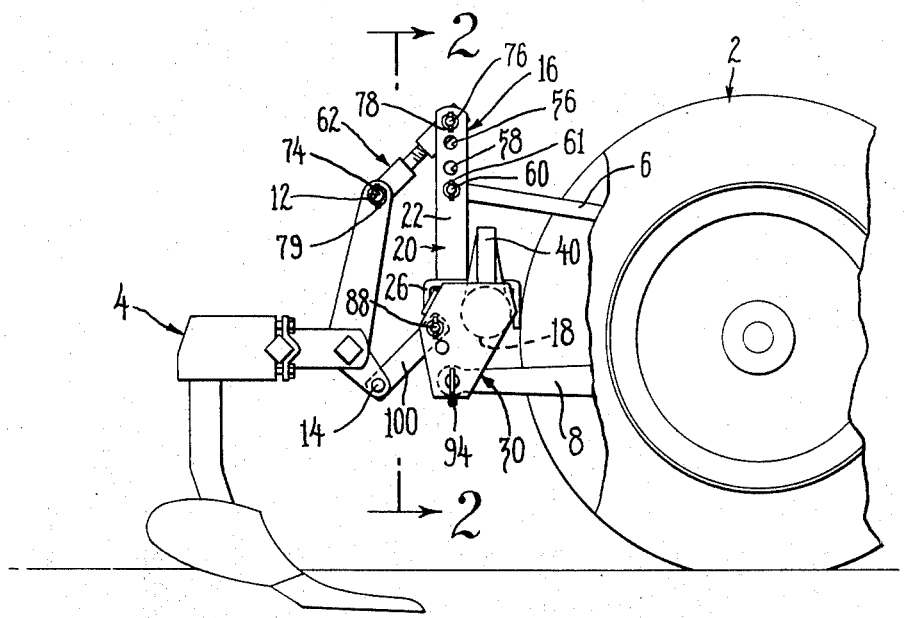
FIG. 1 is an elevational view of a tractor and implement with a hitch coupling embodying the invention.

The coupling member 16 includes a tubular cross-member 18 and an upright mast 20 mounted between the ends of the cross-member 18. The mast 20 is made up of a pair of spaced parallel plates 22 and 24 (FIGS. 2 and 3) welded to an inverted U-shaped support member 26 secured to a rod 28 extending from the cross-member 18. A strap member 27 is welded between plates 22 and 24. Mounted on each end of the cross-member 18 is a lower hitch point attachment unit 30 made up primarily of three plates depending from the cross-member 18. Each attachment unit includes an inner plate 34, a middle plate 36 and an outer plate 38. A brace member 40 has its ends secured adjacent the upper edge of the middle plates 36 and extends over support arms 42 and 44 projecting upwardly from cross-member 18. Straps 46 and rods 48 extend between the plate members 34, 36 and 38 to lend rigidity to the attachment units.

The mast 20 is formed with first and second sets of Category I size hitch pin holes 52 and 54, respectively, and first and second sets of Category II size upper hitch pin holes 56 and 58, respectively. In the illustrated embodiment, the tractor links are Category I links and the hole 11 in the ball end 10 of link 6 is the size to receive Category I type upper hitch pins. In FIG. 1, the upper link 6 is pivotally connected with mast 20 by a Category I tractor hitch pin 60 engaged in the second, lower set of Category I holes 54 in mast 20. A linch pin 61 is mounted in the end of pin 60 to prevent its disengagement from the holes.

In the illustrated embodiment, the implement is attached to the coupler through links to provide an equalizing type of attachment of the general type shown in Fraga U.S. Patent 2,888,997 of June 2, 1959. The upper hitch point 12 is secured to the mast 20 by an adjustable upper implement hitch link 62. Link 62 includes a Category II portion 64 and a Category I portion 66 each of which is threadedly mounted on a rod 68. A Category II hitch pin hole 70 is provided in portion 64 and a Category I hitch pin hole 72 is provided in portion 66 of link 62. In the FIG. 1 embodiment, implement 4 is a Category II implement, and a Category II upper hitch pin 74 connects the Category II portion 64 of link 62 with the upper hitch point 12 of the implement. A Category I upper hitch pin 76 pivotally connects portion 66 with mast 20 through the Category I holes 52. Linch pins 78 and 79 are mounted respectively in the ends of hitch pins 76 and 74.

The attachment units 30 are each provided with a set of Category II lower hitch pin holes 80 in the inner and middle plates 34 and 36 in alignment with a Category I lower hitch pin hole 84 in the outer plate 38, and a second set of Category II lower hitch pin holes 82 in the middle and outer plates 36 and 38 in alignment with a second Category I lower hitch pin hole 86 in the inner plate 34. Mounted in holes 80 and 84 is a stepped lower hitch pin 88 having a large diameter portion 90 of Category II size and a small diameter portion 92 of Category I size. When the hitch pin 88 is mounted in its associated attachment unit 30, the Category II portion 90 is engaged in holes 80 and the Category I portion 92 is engaged in hole 84. A hitch pin 94 of similar construction having a Category II portion 96 and Category I portion 98 is engaged in holes 82 and 86 in the same manner.

Figure 2:
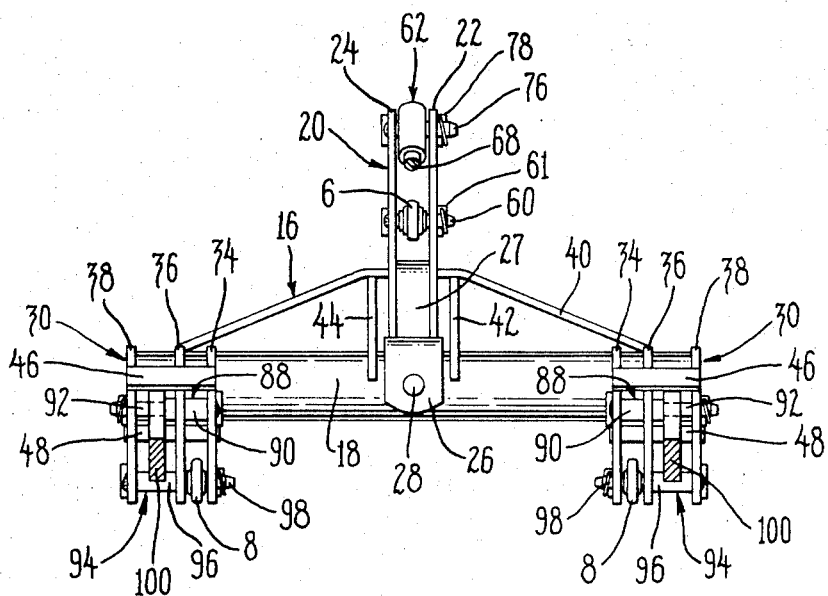
FIG. 2 is a sectional view taken on lines 2—2 of FIG. 1.
Figure 3:
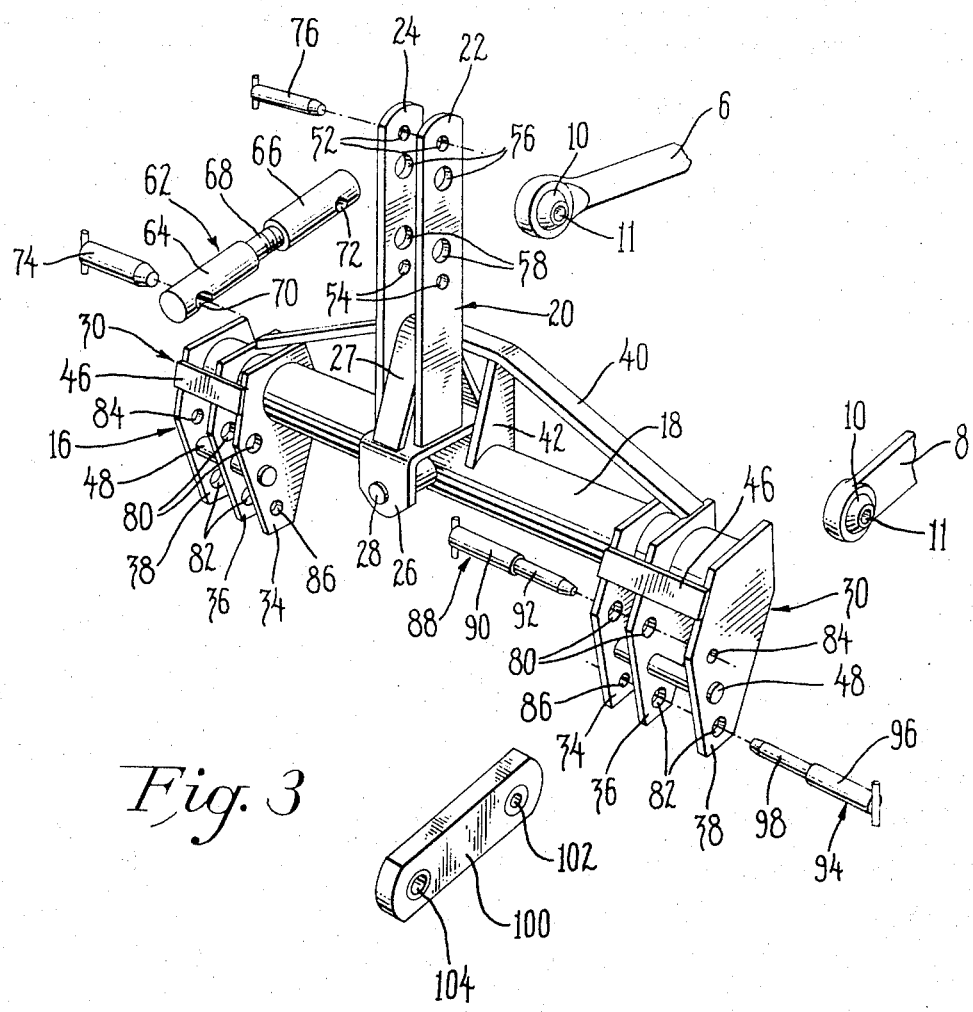
FIG. 3 is an exploded perspective of the coupling of FIGS. 1 and 2.

The lower hitch studs 14 of the implement are connected with the lower attachment units 30 through lower implement hitch links 100. Each lower hitch link 100 is formed with a Category I hole 102 adjacent one of its ends and a Category II hole 104 adjacent its opposite end. In the FIG. 1 embodiment, implement 4 is a Category II implement and the Category II hole 104 is pivotally engaged with the lower studs 14 on the implement and the Category I hole 102 is pivotally engaged with the Category I portion 92 of the stepped lower hitch pin 88 as shown in FIG. 2. The lower tractor links 88 in turn are pivotally engaged with the Category I portion 98 of the lower hitch pin 94.

The space between links 100 in FIG. 2 is the standard A.S.A.E. spacing for the lower hitch point spread for a Category II implement and the spacing between the lower tractor hitch links 8 in FIG. 2 is the standard A.S.A.E. lower hitch point spread for a Category I implement.

To connect a Category I implement with the same tractor links, the Category II hole 104 in link 100 is mounted on the Category II portion 90 of the lower hitch pin 88, and the position of link 62 is reversed such that the Category II hitch pin 74 is engaged in set 56 of Category II holes in mast 20. If the tractor has a Category II hitch instead of the Category I hitch shown in the drawings, the lower hitch links 8 are mounted on the Category II portion 94 of the lower hitch pin 94 and the upper link 6 is mounted in one of the Category II set of holes 58 in mast 20.

While a specific example of the invention has been illustrated and described, it should be understood that the invention is not limited to the exact construction shown, but that various alterations in the construction and arrangement of parts is possible.

We claim:
1. A coupling member for connecting an implement with the hitch linkage of a tractor comprising a cross-member, an upright mast mounted on the cross member between the ends thereof, first upper mounting means on said mast for supporting a first set of upper hitch pins at each of their ends, second upper mounting means on said mast for supporting a second set of upper hitch pins at each of their ends, tractor lower link and implement lower hitch point attachment units on each end of said cross-member, first lower mounting means on each of said attachment units for supporting a first set of lower hitch pins at each of their ends, second lower mounting means on each of said attachment units for supporting a second set of lower hitch pins at each of their ends, said first and second sets of lower hitch pins having different diameter, whereby an implement requiring hitch pins of the diameter of either the first or second sets of upper and lower hitch pins can be connected through said coupling member with a tractor hitch linkage requiring hitch pins of the diameter of either the first or second sets of upper and lower hitch pins.

2. Coupling apparatus for connecting either a Category I or Category II implement with either a Category I or Category II tractor three-point hitch comprising a cross-member; an upright mast mounted on the cross-member between the ends thereof, said mast comprising a pair of spaced, parallel plate members; a pair of vertically spaced Category I upper hitch pin holes in each of said plate members, said pair of Category I holes in one of said plate members being coaxial with said pair of Category I holes in the other of said plate members; a pair of vertically spaced Category II upper hitch pin holes in each of said plate members with said pairs of Category II holes being in axial alignment with each other; a lower tractor link and implement lower hitch point attachment unit mounted on each end of said cross member, each of said attachment units including three spaced, parallel plates comprising an outer plate mounted adjacent the end of the cross-member, an inner plate mounted between the outer plate and the mid-point of the cross member, and a middle plate mounted between the inner and outer plates, a first pair of axially aligned Category II lower hitch pin holes in the inner and middle plates, a second pair of axially aligned Category II lower hitch pin holes in the middle and outer plates spaced from said first of Category II lower hitch pins holes, a first Category I lower hitch pin hole in the outer plate in axial alignment with said first pair of Category II lower hitch pin holes, and a second Category I lower hitch pin hole in the inner plate in axial alignment with said second pair of Category II lower hitch pin holes.

3. Coupling apparatus as claimed in claim 2 further including a pair of lower hitch pins for each of said attachment units, each of said lower hitch pins having a Category II diameter over a portion of its length and a Category I diameter over the remainder of its length, one of said lower hitch pins being removably engageable with said first set of Category II lower hitch pin holes and said first Category I hole, and the other of said lower hitch pins being removably engageable with said second pair of Category II lower hitch pin holes and said second Category I lower hitch pin hole.

4. Coupling apparatus as claimed in claim 3 further including a lower hitch link for each of said attachment units, said lower hitch link having a Category I lower hitch pin hole adjacent one end thereof and a Category II lower hitch pin hole adjacent the other end thereof, said one end of said lower hitch link being selectively engageable with the Category I portions of said lower hitch pins and said other end being selectively engageable with the Category II portions of said lower hitch pins.

5. Coupling apparatus as claimed in claim 4 wherein the inner and middle plates of one of the attachment units is spaced from the inner and middle plates of the other attachment unit a distance corresponding to the standard Category I lower hitch point spread, and the middle and outer plates of one of the attachment units is spaced from the middle and outer plates of the other attachment unit a distance corresponding to the standard Category II lower hitch point spread so that the lower hitch link can be mounted on the Category I portion of the lower hitch pin in said first pair of Category II lower hitch pin holes for connecting a Category II implement with the cross-member, and can be mounted on the Category II portion of the lower hitch pin in said first pair of Category II holes for connecting a Category I implement with the cross-member.

6. Coupling apparatus as claimed in claim 5 further including an upper hitch link formed with a Category I upper hitch pin hole adjacent one end thereof and a Category II upper hitch pin hole adjacent the other end thereof.

7. Coupling apparatus as claimed in claim 6 further including a Category I upper hitch pin engaged in the Category I upper hitch pin hole in the upper hitch link and a Category II upper hitch pin engaged in the Category II upper hitch pin hole in the upper hitch link whereby the Category I end of the upper hitch link can be pivotally mounted between the mast plate members for connecting a Category II implement with the mast, and the Category II end of the upper hitch link can be pivotally mounted between the mast plate members for connecting a Category I implement with the mast.

8. Coupling apparatus as claimed in claim 7 wherein said upper hitch link includes a center rod, a Category I portion threadedly mounted on one end of said rod, and a Category II portion threadedly mounted on the other end of said rod, said Category I and II upper hitch pin holes being formed respectively in said Category I and II portions.

References Cited

UNITED STATES PATENTS

| | | | |
|---|---|---|---|
| 2,527,613 | 10/1950 | Zagurski | 172—448 |
| 2,873,125 | 2/1959 | Bywater | 172—439 X |
| 3,031,208 | 4/1962 | Abbott | 280—460 |
| 3,066,952 | 12/1962 | Price | 280—415 |
| 3,151,883 | 10/1964 | Stuart | 280—415 |
| 3,226,818 | 1/1966 | Abbott | 280—415 X |
| 3,391,949 | 7/1968 | Abbott | 280—415 |

FOREIGN PATENTS

| | | |
|---|---|---|
| 212,363 | 7/1957 | Australia. |
| 767,210 | 1/1957 | Great Britain. |
| 771,600 | 4/1957 | Great Britain. |
| 870,883 | 6/1961 | Great Britain. |

OTHER REFERENCES

Nuber, J. German DAS No. 1,107,986 published May 31, 1961.

German printed application, 1,170,187 (1964).

LEO FRIAGLIA, Primary Examiner

U.S. Cl. X.R.

172—248, 439; 280—461